Aug. 31, 1926. 1,597,918
J. B. MANGAN
AEROPLANE PARACHUTE
Filed Oct. 5, 1925 2 Sheets-Sheet 1
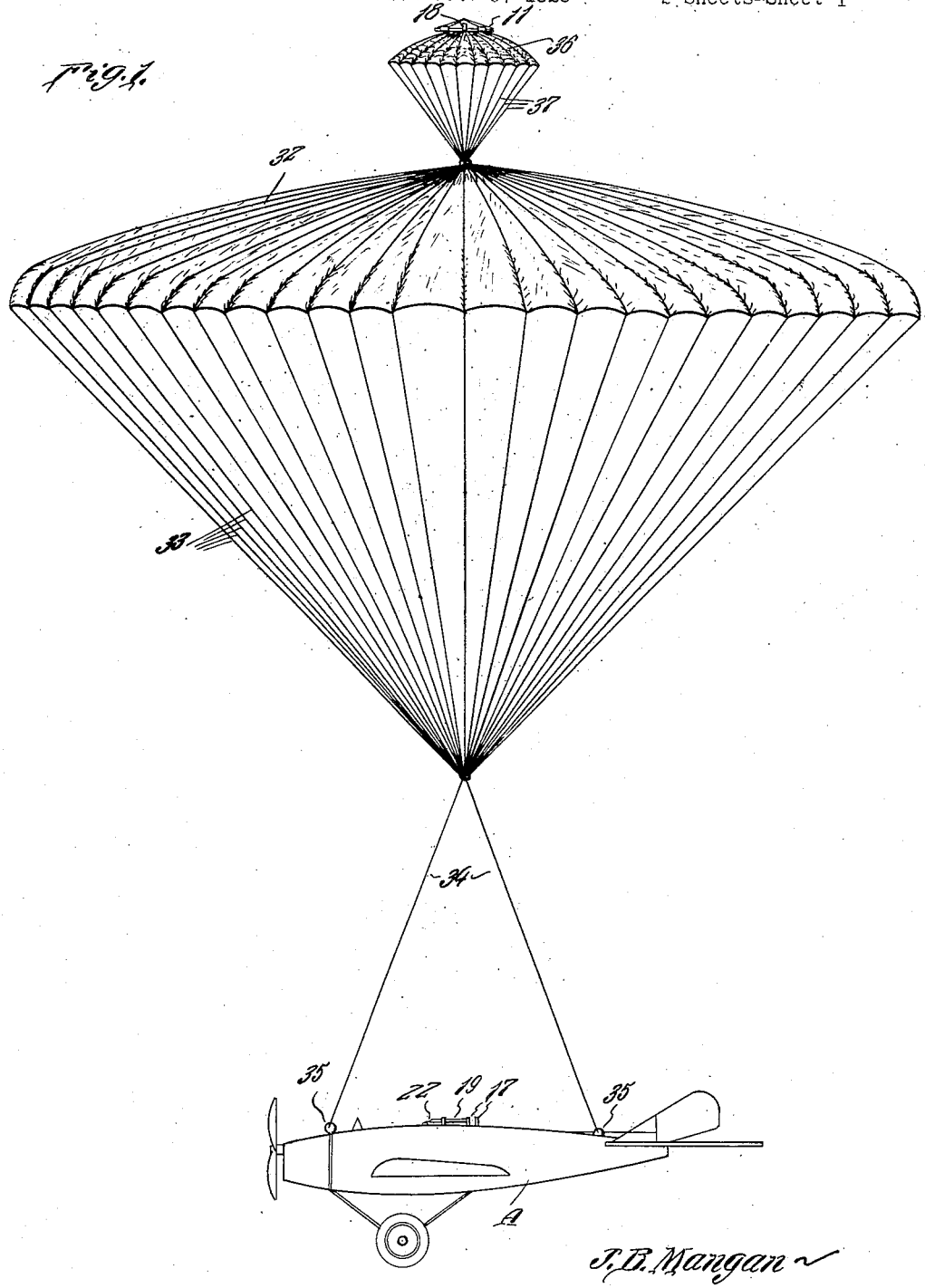

Aug. 31, 1926. 1,597,918
J. B. MANGAN
AEROPLANE PARACHUTE
Filed Oct. 5, 1925   2 Sheets-Sheet 2
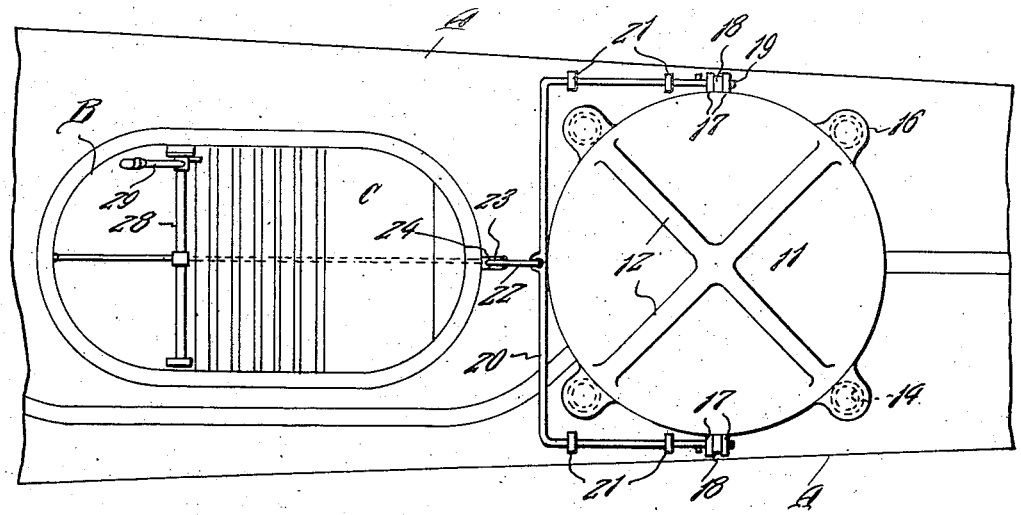
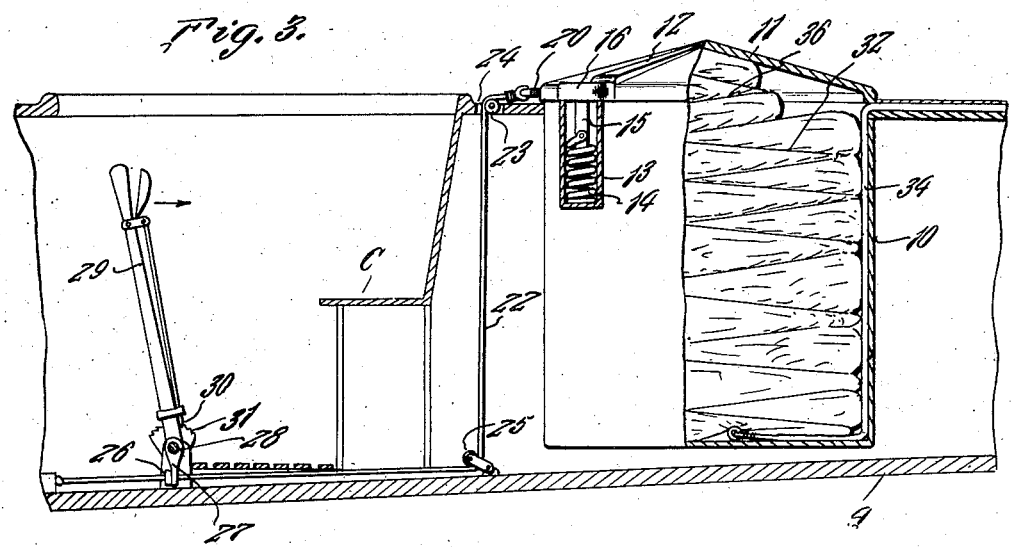
INVENTOR
J. B. Mangan
BY Victor J. Evans
ATTORNEY Patented Aug. 31, 1926.

1,597,918

UNITED STATES PATENT OFFICE.

JOSEPH B. MANGAN, OF NORTH HAVEN, CONNECTICUT.

AEROPLANE PARACHUTE.

Application filed October 5, 1925. Serial No. 60,565.

This invention relates to safety devices for use in connection with aeroplanes and has for its object the provision of a novel parachute structure designed to be mounted permanently upon an aeroplane and capable of being released in the event of an accident to the aeroplane which would make an ordinary landing impossible, the parachute consequently acting to support the aeroplane and permit it to settle slowly to the ground without injury to the machine itself or to the occupants thereof.

An important object is the provision of means mounted on an aeroplane normally containing the parachute device, means being provided whereby the parachute may be released and permitted to operate in case the necessity arises, the releasing means being under the control of the pilot or mechanician, or preferably both, so that either one or the other may operate the release mechanism.

Still another object is the provision of a device of this character in which spring means is provided for forcibly ejecting the parachute from its container so as to insure proper opening.

An additional object is the provision of an apparatus of this character which will be comparatively simple and inexpensive, easy to install and operate, positive in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, wherein:—

Figure 1 is a side elevation of the parachute showing it fully open and supporting an aeroplane.

Figure 2 is a plan view of the mechanism mounted upon a portion of the aeroplane.

Figure 3 is a vertical longitudinal section through the same, and

Figure 4 is a detail section.

Referring more particularly to the drawings, the letter A designates a portion of the body or fuselage of an aeroplane having the usual cock pot B within which is located the seat C for the pilot. In aeroplanes of some types there are two cock pits provided, one containing a seat for the pilot and the other containing a seat for a mechanician, observer or passenger. The invention is of course equally applicable to both types of machines.

In carrying out the invention, I provide a tank-like receptacle 10 mounted within the body or fuselage A at any desired or preferred point, but naturally preferably near the central portion, which tank-like receptacle or container is provided with a cover 11 which is preferably of somewhat conical formation and provided with intersecting ridges 12, constituting reinforcing means. It is intended that this cover fit sufficiently tightly that it will remain in closed position under ordinary circumstances so that accidental displacement will be prevented.

Located exteriorly of the tank-like receptacle or container 10 is a plurality of pockets 13 containing expansible coil springs 14 connected with the lower ends of plungers 15 which bear against the undersides of extensions 16 on the cover 11, at the edges thereof. The purpose of these upwardly spring pressed plungers is to apply force to the cover 11 and normally tending to unseat or open the same.

The means for normally holding the cover closed comprises bracket members 17 suitably rigidly mounted upon the body or fuselage A and receiving between them ears 18 at the edge of the cover, the bracket members and the ears both being apertured for the passage of the arms 19 of a U-shaped locking bar 20, these arms 19 being slidable through suitable stationary guides 21 mounted on the body or fuselage. Connected with the center of the bight portion of the U-shaped locking bar or rod 20 is a flexible member 22, such as a cable or the like trained over a guide pulley 23 located within an opening 24 in the body or fuselage and trained beneath a suitable guide roller or pulley 25 mounted at the bottom portion of the body or fuselage, this flexible member extending forwardly to any desired distance and being provided intermediate its ends with a stop button 26 engaged by a crank arm 27 carried by a rock shaft 28 equipped with an emergency lever 29 having a grip released latch 30 thereon cooperating with a notched segment 31. As a matter of fact, the flexible member 22 is continued forwardly beyond the lever 29 for connection with a structure similar thereto mounted in advance of whatever seat is provided in the front of the seat C. It is believed that this detail will be readily understood without a detailed illustration and description thereof inasmuch as it involves only a duplication of the parts 27 to 31 inclusive.

The parachute, designated by the numeral 32 is of course normally folded and contained within the tank-like receptacle 10, the edges of the parachute being provided with a plurality of ropes or other flexible members 33 which converge downwardly and which are connected with a pair of cables 34 which are in turn connected with suitable eyes or bracket members 35 which are rigidly secured to the fuselage or body near the forward and rear ends thereof. The specific means for attaching these cables is a minor detail which may be varied within wide limit. Secured to the center of the main parachute 32 is a guide parachute or auxiliary device 36 which has its edges connected with the center of the main parachute 32 by a plurality of cords or ropes 37 and which has its center connected with the underside of the top or cover 11 of the tank-like receptacle 10. The cables 34 for the main parachute 32 are brought in at the top of the tank-like receptacle 10 and extend originally to the bottom portion thereof, as clearly indicated in Figure 3.

In the use of the device, the cover 11 is of course first removed and the main parachute 32 and guide parachute 36 are collapsed and forced into the tank-like receptacle 10, subsequently to which the cover 11 is applied and forced down to compress the springs 14 so that the arms 19 of the locking bar 20 may be inserted through the ears 18. When this is done, the device is all set ready for use.

In case an emergency occurs, either person occupying the machine may grasp the lever 29, or its equivalent located in advance thereof, not shown, and pull rearwardly in the direction of the arrow in Figure 3. When this is done, the rock shaft 28 will be rocked and the crank arm 27 engaging against the button 26, or the equivalent mechanism associated with the other lever, not shown, will operate to apply a pull upon the flexible members 22.

This pull applied to the locking bar 20 will of course effect movement thereof forwardly so that the arms 19 thereof will be withdrawn from engagement within the apertured ears 18 carried by the cover 11. The upwardly spring pressed plungers 15 will then operate to unseat the cover 11 and the upward movement of the cover, when forced from its seat, will carry the auxiliary or guide parachute 36 with it. Upon being exposed to currents of air, the guide parachute 36 will open and this will cause the main parachute 32 to be drawn out of the tank-like receptacle 10 so that when the wind engages thereunder it will open out into its extended form as clearly indicated in Figure 1, consequently acting to support the aeroplane and permit it to settle slowly to the ground instead of rapidly. Obviously, in this way it is clear that there will be no injury to the machine itself or to the occupants thereof. Quite naturally, the parachute structure may be used over and over, it being merely necessary that it be restored to its normal position subsequent to each operation.

From the foregoing description and a study of the drawings, it is believed that the construction, operation and advantages will be readily apparent to one skilled in the art without further explanation. Attention is, however, directed to the fact that the device is bound to be a great saver of life and property and consequently worth many times its costs in this respect.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

In an apparatus of the character described, a receptacle mounted within the body of an aeroplane, upwardly spring pressed plunger members mounted on the receptacle, a cover for the receptacle, provided with outwardly extending retaining elements, bracket members mounted on the body of the aeroplane, a U-shaped locking member slidably mounted with respect to the body and engaging through said bracket members and said retaining elements, a parachute arranged within said receptacle in folded position, and carrying cables connected with the body at various points, a flexible member connected with said locking member, and lever operated means for applying tension to said flexible member for releasing the locking means.

In testimony whereof I affix my signature.

JOSEPH B. MANGAN.